May 22, 1962 E. M. SELZLER 3,035,554
HYDROSTATIC MOTOR
Filed June 15, 1959 3 Sheets-Sheet 1

INVENTOR: EDWIN M. SELZLER
BY
HIS ATTORNEYS

May 22, 1962 E. M. SELZLER 3,035,554
HYDROSTATIC MOTOR
Filed June 15, 1959 3 Sheets-Sheet 2
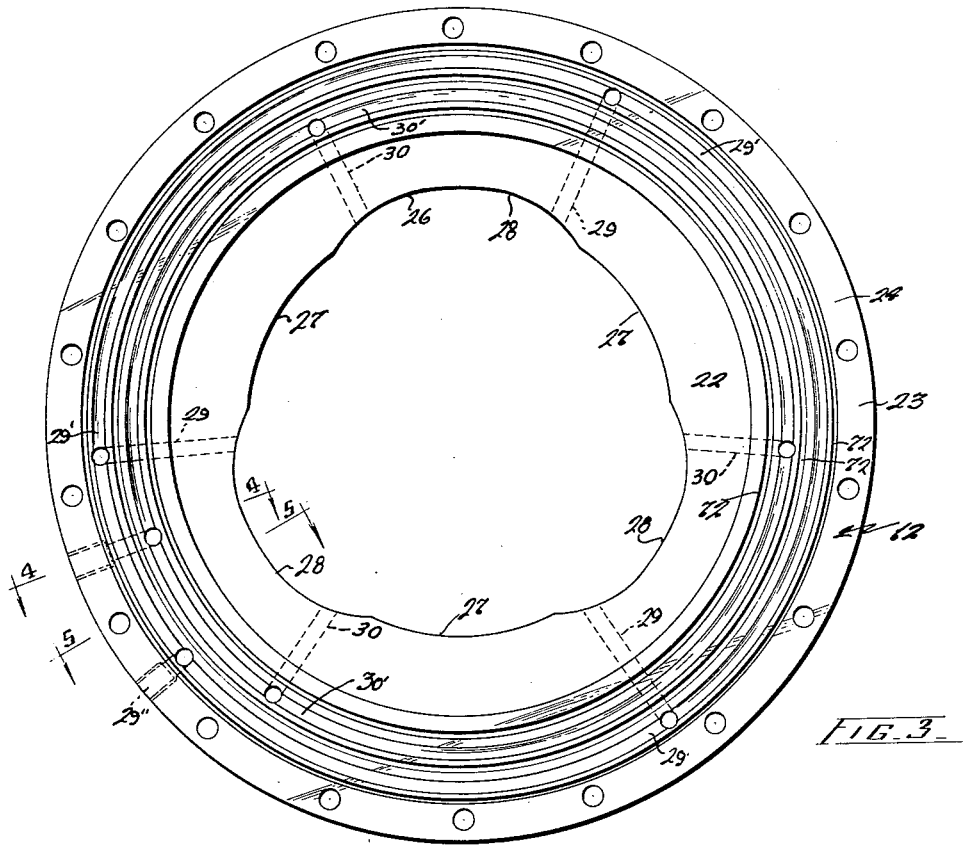
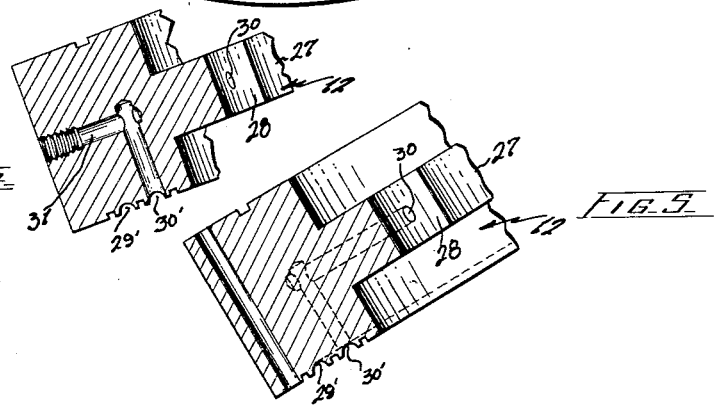
INVENTOR: *Edwin M. Selzler*
BY
HIS ATTORNEYS May 22, 1962  E. M. SELZLER  3,035,554
HYDROSTATIC MOTOR
Filed June 15, 1959  3 Sheets-Sheet 3
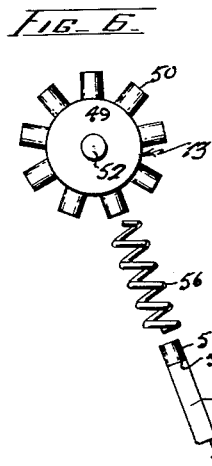
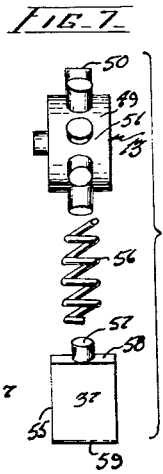
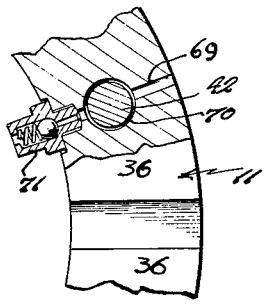
FIG. 6.  FIG. 7.  FIG. 8.
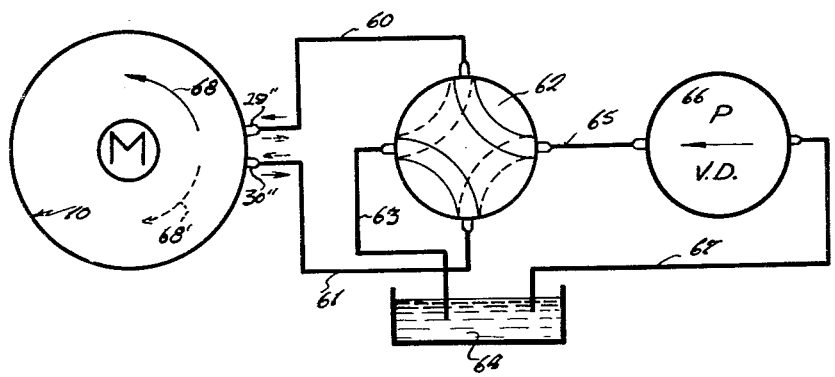
FIG. 9.
INVENTOR: *Edwin M. Selzler*
BY
*Fetherstonhaugh & Co.*
HIS ATTORNEYS

United States Patent Office 3,035,554
Patented May 22, 1962

3,035,554
HYDROSTATIC MOTOR
Edwin M. Selzler, 3410 31st SW., Calgary,
Alberta, Canada
Filed June 15, 1959, Ser. No. 820,358
13 Claims. (Cl. 121—86)

My invention relates to new and useful improvements in hydrostatic motors. Hydraulic or hydrostatic motors of one form or another, suffer from several disadvantages, the principal ones of which are considerable pulsing, heavy bearing pressure in the supporting bearings of the rotor, difficulty in starting in any direction irrespective of where the rotor stops, and difficulties in sealing the hydraulic fluid within the motor.

I have overcome all of these disadvantages by providing a cam ring held between the casing of the device and having a rotor mounted for rotation therewithin, said cam ring having an odd number of cam profiles and recesses formed thereon. By providing a slider which holds an odd number of vanes, and by balancing the pressure between the recesses and the interior of the rotor, I eliminate severe bearing pressure, eliminate pulsing, and permit the motor to be started in either direction irrespective of where the rotor has stopped. The latter is accomplished by a vernier relationship caused by the odd number of recesses and the odd number of vanes.

By providing a pair of steel rings upon each side of the cam ring in association with conventional resilient seals, any leakage is eliminated.

The principal object and essence of my invention is therefore to provide a motor of the character herewithin described which eliminates pulsing and which, furthermore, will start in either direction irrespective of the stopping position of the rotor.

Another object of my invention is to provide a device of the character herewithin described wherein the pressure is equalized between the recesses of the cam ring and the interior of the rotor which in turn prevents leakage occurring around the rotor.

Another object of my invention is to provide a device of the character herewithin described in which the torque is constant but in which the speed of rotation can be varied by conventional means.

Yet a further object of my invention is to provide a device of the character herewithin described which is particularly suitable for independent drive for vehicles and which furthermore can be utilized instead of line shafting and the like in machine shops etc., it only being necessary to convey the fluid pressure to each machine which can be supplied with its own hydrostatic motor.

A yet further object of my invention is to provide a device of the character herewithin described which can be built in any convenient size with 3, 5 or 7 or more recesses and cam profiles depending upon the torque conversion required.

A still further object of my invention is to provide a device of the character herewithin described which contains few moving parts and is therefore relatively economical in production and requires little or no service during use.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 3 is a front elevation of the cam ring per se.

FIGURE 4 is a section of FIGURE 3 along the lines 4—4 of FIGURE 3.

FIGURE 5 is a section of FIGURE 3 substantially along the lines 5—5 of FIGURE 3.

FIGURE 6 is a front elevation of the spider and one of the vanes.

FIGURE 7 is a view similar to FIGURE 6 but at right angles thereof.

FIGURE 8 is an enlarged fragmentary and partially sectioned view of one of the shoulders showing the non-return valve therein.

FIGURE 9 is a schematic view of the device together with the associated four way valve and variable delivery pump.

In the drawings like characters of reference indicate corresponding parts in the different figures.

Figure 2:
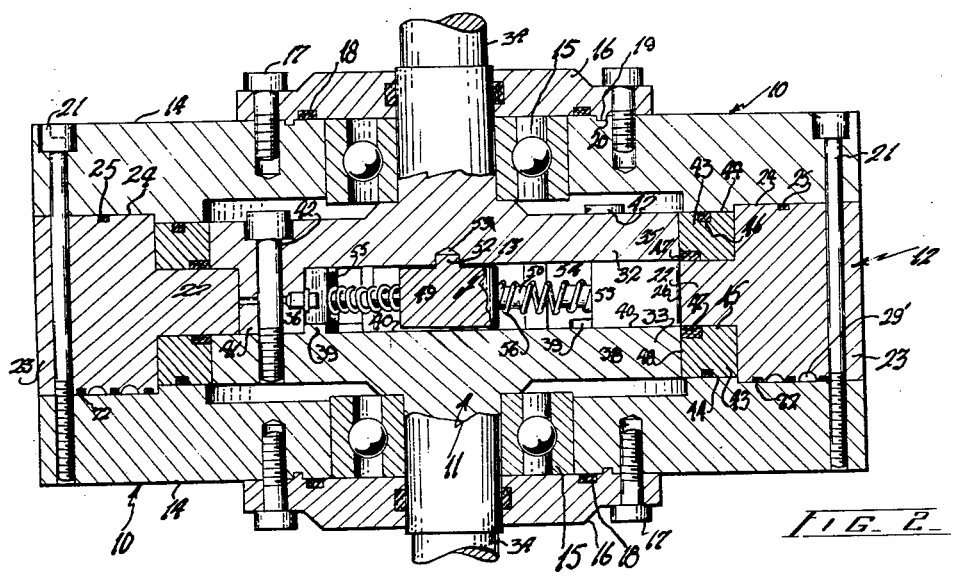
FIGURE 2 is a section substantially along the lines 2—2 of FIGURE 1.

Proceeding therefore to describe my invention in detail, reference should be made to the accompanying drawings, in which I have shown a casing, collectively designated 10, a rotor collectively designated 11, the cam ring collectively designated 12, and the spider assembly collectively designated 13.

In detail, the casing 10 consists of two halves 14 substantially circular when viewed in front elevation and being apertured centrally to carry bearings 15. These bearings are retained by means of bearing plate 16 secured to the casing half by bolts 17, resilient sealing rings 18 being provided to prevent leakage of fluid therepast. In this connection note should be taken of the shoulders 19 on the bearing plate engaging annular grooves 20 within the casing.

The cam ring consists of an annular ring, the external diameter of which is similar to the external diameter of the casing half 14, said cam ring adapted to be clamped between the casing halves by means of bolts 21.

The cam ring, when viewed in cross section as shown in FIGURE 2, is shouldered providing a central inwardly situated vane bearing portion 22 and clamping portion 23 upon either side thereof. These clamping portions nest within shouldered recesses 24 with the casing halves which assist in the location of the cam ring when the motor is assembled. In this connection a resilient seal 25 is situated within a recess on one side of the clamping portion as clearly shown in FIGURE 2.

Reference to FIGURE 3 will show the front elevation of the cam ring per se and it will be noted that the inner surface 26 of the vane bearing portion 25 is formed to provide cam profiles 27 and recesses 28 alternatively therearound, it being noted that there are three recesses 28 and three profiles 27. Although the invention as described and illustrated consists of three recesses and three cam profiles, it should be understood that this number can be increased providing the number of recesses equal the number of cam profiles and that there are an odd number of recesses and an odd number of profiles.

It will be noted that each recess 28 is provided with a pair of drillings 29 and 30 entering the recesses adjacent each end thereof. These recesses are adapted to carry hydraulic fluid under pressure as will hereinafter be described, in one direction or another and the drillings 29 extend to an annular gallery 29' formed on one side of the cam ring as clearly shown in the drawings. Drillings 30 each communicate with a further annular gallery 30' formed upon the same side of the cam ring and details of these drillings are shown in FIGURE 4.

At a convenient location around the annular galleries 29' and 30', take-off drillings 31 are provided communicating with conduit connections 29″ anl 30″ respectively, the purpose of which will hereinafter be described.

Figure 1:
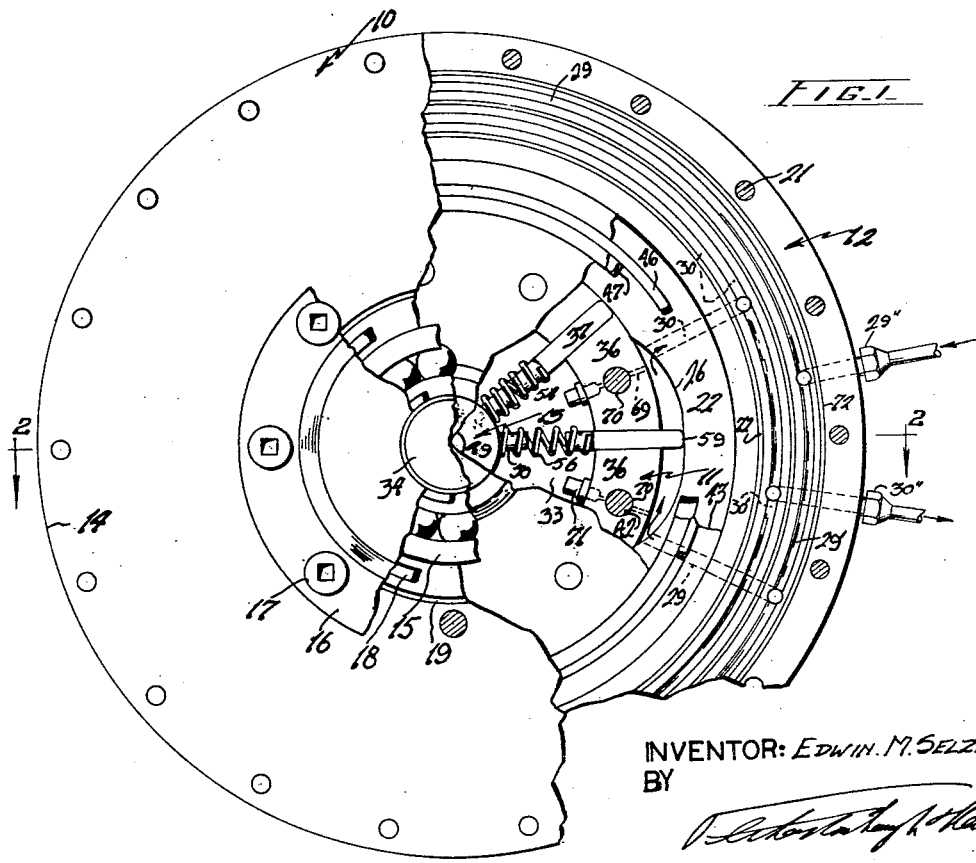
FIGURE 1 is a front elevation of my device, sectioned in part to show the interior thereof.

The rotor collectively designated 11 consists of two halves 32 and 33. The half designated 32 consists of a shaft 34 adapted to rotate within one of the bearings 15 carried by the casing side 14. A disc 35 is formed upon the inner end of the shaft 34, said disc being provided with a plurality of shoulders 36 upon the inner face 37 thereof and adjacent the outer perimeter thereof. These shoulders are in the form of segments as shown in FIGURE 1 and act as guides for vanes 55 to reciprocate therein as will hereinafter be described.

The other half 33 of the rotor also consists of a shaft 34 supported within a bearing 15 in a similar manner and having a disc 38 formed upon the inner end thereof of a similar diameter to the disc 35. An annular shoulder 39 is formed upon the inner face 40 of this disc, said annular shoulder adapted to receive the extremities 41 of the shoulders 36 thereby locating the two discs in radial relationship one with the other so that they can be clamped together by means of bolts 42. It will therefore be seen that the shoulders 36 maintain the discs 35 and 38 in spaced and parallel relationship when the device is assembled by means of the aforementioned bolts 42.

It will therefore be seen that the rotor 11 is supported for rotation within the casing 10.

Sealing means are provided between the rotor, the sides of the casing, and the cam ring 12, comprising annular steel rings 43 clamped between the inner faces 44 of the casing and the side faces 45 of the vane bearing portion 22 of the cam ring. Resilient seals 46 are situated within recesses in the sealing rings 43 and bear against the aforementioned inner faces 44 of the casing and synthetic bearing rings 47, carried within recesses in the sealing rings bear against the side faces 45 of the vane bearing portion 22 and against the perimeters of the disc 35 and 38.

In this connection it should be mentioned that the steel rings 43 are stationary and that there is a running clearance between the perimeters of the discs and the inner surfaces 48 of the sealing rings 43.

The spider assembly collectively designated 13 is shown in detail in FIGURES 6 and 7 and consists of a cylindrical hub 49 and a plurality of pins 50 extending radially from the perimeter 51 of the hub. One side of the hub is provided with a spigot 52 adapted to engage within a recess 53 provided centrally upon the inner surface 37 of the disc 35 and this supports the spider freely in this location. It will be observed that when the rotor is assembled, the shoulders 36 form a centrally located recess 54 between the discs within which the aforementioned spider is situated.

A plurality of vanes 55 are supported for reciprocal motion between adjacent segments or shoulders 36 of the rotor and these vanes are supported upon the spider by means of springs 56 engaging over the aforementioned pins 50 of the spider and corresponding pins 57 upon the inner ends 58 of the vanes, the springs assisting in maintaining the outer ends 59 of the vanes in contact with the aforementioned cam profiles 27 and the wall 28′ of the recesses 28 within the cam ring. It is necessary that there be a greater number of vanes than there are profiles for the purpose hereinafter to be described.

Referring back to the conduit connection 29″ and 30″, reference should be made to FIGURE 9 which shows the schematic relationship between the various components. In this connection M represents the motor, that is the subject matter of this invention with the conduit connection 29″ and 30″ extending therefrom. Fluid lines 60 and 61 extend from these conduit connections respectively, to a four way valve 62 which in turn has a further conduit 63 extending from the valve to a fluid reservoir 64 and a still further conduit 65 also extending from the four way valve to a variable delivery pump 66 which in turn, is also connected to the fluid reservoir 64 by means of conduit 67.

The variable delivery pump is operated by a convenient source of power (not illustrated) so that by operating the four way valve 62 to connect the conduits as shown in solid line, the fluid is made to travel through conduit 60, through the connection 29″, to the outer annular gallery 29′ within the cam ring 12 and thence through the drilling 29 to one side of each of the recesses 28. This fluid under pressure will impinge against the right hand side of the vanes 55 thus causing the rotor to rotate anticlockwise or in the direction of arrow 68. Under these circumstances oil in advance of the vanes will exhaust through drilling 30 in each of the recesses, to annular gallery 30′ within the cam ring 12, and thence to the conduit connection 30″, through the conduit 61, through the four way valve 62 and into the fluid reservoir 64 by means of conduit 63.

However, if the four way valve is rotated so that the connections between the conduit is similar to that shown by the phantom lines in FIGURE 9, then the entire process is reversed and the motor is caused to rotate clockwise or in the direction of arrow 68′ shown in phantom in FIGURE 9.

It is desirable to ensure that pressure is equalized within the recess 54 in the rotor and within the recesses 28 formed in the cam ring 12 and in this connection I provide drillings 69 upon each side of the bolt hole 70 carrying the bolt holding the two discs together forming the rotor. This is shown in detail in FIGURE 8, it being observed that there is a clearance around these bolts thus permitting oil to pass thereby. It will also be appreciated that it is undesirable for oil to exhaust from the recess 54 outwardly to the recess 28 otherwise same would discharge through the drillings in the recess. This is prevented by the provision of a spring loaded non-return valve 71 connecting with the drillings 69 on the interior side of the shoulders 36 as clearly shown in the aforementioned FIGURE 8.

From the foregoing, and by the provision of the odd number of recesses, and cam profiles and of a greater number of vanes than profiles, it will be appreciated that irrespective of where the rotor stops, and irrespective of which direction it is desired to rotate the rotor when starting again, there is always a blade or vane adjacent one of the input drillings to the recesses 28 as the aforementioned odd number relationship gives a vernier positioning around the circumference of the cam ring. This not only prevents pulsing but permits maximum torque to be exerted irrespective of the speed of rotation desired of the rotor which, of course, is controlled by the variable delivery pump or similar equivalent. Furthermore, the pressure being equalized upon the interior of the rotor, causes the vanes to be maintained in contact with the cam profiles 27 or the aforementioned walls 28′ of the recesses 28. The springs are provided to maintain the vanes in their uppermost position when the motor is stationary and to ensure that they are in contact with the aforementioned cam profiles or walls 28′ when the motor is started.

The aforementioned sealing rings 43 together with the seals 46 and bearing rings 47, ensure that leakage does not occur and the concentric arrangement of the vanes and the cam profiles relieve the bearings of any hydraulic thrust during the operation of the device.

Finally, reference should be made to the aforementioned galleries 29′ and 30′ which are formed upon one side of the cam ring 12′. In order to seal these galleries one from the other and from the exterior of the motor, I have provided a plurality of concentrically located resilient seals 72 upon each side of each of these galleries as clearly shown in FIGURE 2.

Since various modifications can be made in my invention as hereinabove described, and many apparently widely different embodiments of same made within the spirit

What I claim as my invention is:

1. A hydrostatic motor comprising in combination a casing, a rotor journalled for rotation within said casing, an annular cam ring supported by said casing around the perimeter thereof, a plurality of recesses and cam profiles alternately formed around the inner perimeter of said cam ring, vane support means located centrally within said rotor, and a plurality of radially extending vanes freely supported by said vane support means and extending radially through said rotor, the extremities of said vanes engaging said cam profiles and the outer wall of said recesses, said rotor comprising two halves detachably secured together, one of said halves including a shaft supported within bearing means in one side of said casing, a disc formed on the inner end of said shaft, said disc having a plurality of shoulders formed thereon adjacent the perimeter thereof, adjacent shoulders acting as guides for said vanes which reciprocate therein, the other of said halves also including a shaft supported within bearing means in the other side of said casing, said other half also having a disc formed on the inner end thereof complementary to said first mentioned disc, said second mentioned disc engaging the inner faces of said shoulders, and means detachably clamping said discs together wherein said shoulders maintain said discs in spaced and parallel relationship, and means cooperating between said shoulders and said second mentioned disc for aligning said discs one with the other.

2. The device according to claim 1 in which said cam ring is provided with an odd number of recesses and an odd, similar number of profiles equidistantly situated therearound, said rotor carrying an odd but greater number of vanes, than there are profiles.

3. The device according to claim 2 in which said shoulders form a centrally located circular recess between said discs when assembled, said vane support means being located within said recess and consisting of a spider freely supported therein, said vanes being freely supported by said spider and extending radially outwardly therefrom.

4. The device according to claim 1 in which said shoulders form a centrally located circular recess between said discs when assembled, said vane support means being located within said recess and consisting of a spider freely supported therein, said vanes being freely supported by said spider and extending radially outwardly therefrom.

5. The device according to claim 4 which includes one way fluid connection between said recesses in said cam ring and said central recess located between said discs.

6. The device according to claim 1 in which said cam ring is shouldered when viewed in cross section providing a central inwardly situated vane bearing portion carrying said profiles and said recesses, clamping portions on either said thereof, and sealing means cooperating between the inner surfaces of said clamping portion and said rotor.

7. The device according to claim 6 in which said shoulders form a centrally located circular recess between said discs when assembled, said vane support means being located within said recess and consisting of a spider freely supported therein, said vanes being freely supported by said spider and extending radially outwardly therefrom.

8. The device according to claim 6 in which said sealing means comprises an annular ring extending around each side of said vane bearing portion of said cam ring and being clamped in position between said vane bearing portion and said casing halves, the outer perimeter of said discs being a running fit against the inner surfaces of said rings, and flexible sealing means between said rings and said casing halves.

9. The device according to claim 8 in which said shoulders form a centrally located circular recess between said discs when assembled, said vane support means being located within said recess and consisting of a spider freely supported therein, said vanes being freely supported by said spider and extending radially outwardly therefrom.

10. A hydrostatic motor comprising in combination a casing, a rotor journalled for rotation within said casing, an annular cam ring supported by said casing around the perimeter thereof, a plurality of recesses and cam profiles alternately formed around the inner perimeter of said cam ring, vane support means located centrally within said rotor, and a plurality of radially extending vanes freely supported by said vane support means and extending radially through said rotor, the extremities of said vanes engaging said cam profiles and the outer wall of said recesses, said casing being split annularly to form two portions, said cam ring being held between said portions, said rotor comprising two halves detachably secured together, one of said halves including a shaft supported within bearing means in one side of said casing, a disc formed on the inner end of said shaft, said disc having a plurality of shoulders formed thereon adjacent the perimeter thereof, adjacent shoulders acting as guides for said vanes which reciprocate therein, the other of said halves also including a shaft supported within bearing means in the other side of said casing, said other half also having a disc formed on the inner end thereof complementary to said first mentioned disc, said second mentioned disc engaging the inner faces of said shoulders, and detachable means clamping said discs together wherein said shoulders maintain said discs in spaced and parallel relationship, and means cooperating between said shoulders and said second mentioned disc for aligning said discs one with the other.

11. The device according to claim 10 in which said shoulders form a centrally located circular recess between said discs when assembled, said vane support means being located within said recess and consisting of a spider freely supported therein, said vanes being freely supported by said spider and extending radially outwardly therefrom.

12. The device according to claim 10 in which said cam ring is provided with an odd number of recesses and an odd, similar number of profiles equidistantly situated therearound, said rotor carrying an odd but greater number of vanes, than there are profiles.

13. The device according to claim 12 in which said shoulders form a centrally located circular recess between said discs when assembled, said vane support means being located within said recess and consisting of a spider freely supported therein, said vanes being freely supported by said spider and extending radially outwardly therefrom.

References Cited in the file of this patent

UNITED STATES PATENTS

| | | |
|---|---|---|
| 55,092 | Hall et al. | May 29, 1866 |
| 515,350 | Moore et al. | Feb. 27, 1894 |
| 617,724 | Elgen | Jan. 17, 1899 |
| 659,782 | Baxter | Oct. 16, 1900 |
| 868,841 | Calkins | Oct. 22, 1907 |
| 2,205,705 | Whitehurst | June 25, 1940 |
| 2,221,874 | Kuzmann | Nov. 19, 1940 |
| 2,540,903 | Moushey et al. | Feb. 6, 1951 |
| 2,722,201 | Muse | Nov. 1, 1955 |

FOREIGN PATENTS

| | | |
|---|---|---|
| 2,586 | Great Britain | 1892 |